(12) United States Patent  (10) Patent No.: US 8,851,225 B2
Braun  (45) Date of Patent: Oct. 7, 2014

(54) CONSTRUCTION MACHINERY

(71) Applicant: Bernd Braun, Cologne (DE)

(72) Inventor: Bernd Braun, Cologne (DE)

(*) Notice: Subject to any disclaimer, the term of this patent is extended or adjusted under 35 U.S.C. 154(b) by 0 days.

(21) Appl. No.: 13/859,761

(22) Filed: Apr. 10, 2013

(65) Prior Publication Data

US 2013/0264139 A1 Oct. 10, 2013

(30) Foreign Application Priority Data

Apr. 10, 2012 (DE) .................. 10 2012 103 070

(51) Int. Cl.
| | |
|---|---|
| B60K 26/00 | (2006.01) |
| B60K 26/02 | (2006.01) |
| E02F 9/20 | (2006.01) |
| E02F 9/16 | (2006.01) |
| G09B 9/042 | (2006.01) |
| B62D 1/22 | (2006.01) |

(52) U.S. Cl.
CPC . *E02F 9/16* (2013.01); *B60K 26/02* (2013.01); *B60K 2350/1048* (2013.01); *B62D 1/22* (2013.01); *E02F 9/2004* (2013.01); *B60K 2026/029* (2013.01); *G09B 9/042* (2013.01)
USPC .............. 180/324; 180/321; 180/333

(58) Field of Classification Search
CPC ............ E02F 9/2004; E02F 9/16; B62D 1/22; G05G 1/34; G05G 9/047; B66F 9/26; B60K 2026/029; G09B 9/042
USPC ................. 180/321, 324, 322, 333, 132, 327
See application file for complete search history.

(56) References Cited

U.S. PATENT DOCUMENTS

| | | | | |
|---|---|---|---|---|
| 3,369,682 A | * | 2/1968 | Breault | 414/459 |
| 3,964,564 A | * | 6/1976 | Pittarelli | 180/219 |
| 4,318,451 A | * | 3/1982 | Liggett | 180/324 |
| 4,726,441 A | * | 2/1988 | Conley | 180/322 |
| 4,921,066 A | * | 5/1990 | Conley | 180/322 |
| 5,092,422 A | * | 3/1992 | Hood et al. | 188/329 |
| 5,120,187 A | * | 6/1992 | Weber | 414/694 |

(Continued)

FOREIGN PATENT DOCUMENTS

| | | | | |
|---|---|---|---|---|
| DE | 20117325 U1 | | 2/2002 | |
| DE | 10356919 A1 | * | 7/2005 | ............. G09B 19/16 |

(Continued)

OTHER PUBLICATIONS

Feder, W. DE 20 2007 003703, Aug. 21, 2008, English Machine Translation.*

*Primary Examiner* — Karen Beck

(74) *Attorney, Agent, or Firm* — Michael Soderman

(57) ABSTRACT

This invention relates to construction machinery or a utility vehicle with at least one vehicle cabin or at least one driver's cab with a first seat with first control devices for a first operator, from which all of the essential driving and/or operating functions of the utility vehicle/construction machinery can be controlled. At least one second seat with second control devices for a second operator is provided in the vehicle cabin/the driver's cab in accordance with the invention, from which all of the essential driving and/or operating functions of the utility vehicle/construction machinery can likewise be controlled, including a steering function for the vehicle. Control elements are provided by means of which a higher standing is assigned to the second control devices when the first and second control devices are simultaneously actuated, so that the second control devices override the first control devices.

14 Claims, 6 Drawing Sheets

(56) References Cited

U.S. PATENT DOCUMENTS

| | | | |
|---|---|---|---|
| 5,845,724 A * | 12/1998 | Barrett | 180/65.1 |
| 7,334,658 B2 * | 2/2008 | Berg et al. | 180/333 |
| 8,352,127 B2 * | 1/2013 | Wahlstrom et al. | 701/42 |
| 8,606,463 B2 * | 12/2013 | Bichler et al. | 701/41 |
| 2009/0056964 A1 * | 3/2009 | Kunizawa et al. | 172/823 |
| 2009/0133950 A1 * | 5/2009 | Takemura et al. | 180/305 |
| 2009/0206589 A1 * | 8/2009 | Osswald et al. | 280/782 |
| 2009/0226288 A1 * | 9/2009 | Tanaka | 414/384 |
| 2011/0150615 A1 * | 6/2011 | Ishii | 414/687 |
| 2012/0109459 A1 * | 5/2012 | Bichler et al. | 701/41 |
| 2012/0118661 A1 * | 5/2012 | Kodera et al. | 180/418 |
| 2013/0075156 A1 * | 3/2013 | Casadei | 175/27 |
| 2013/0264139 A1 * | 10/2013 | Braun | 180/322 |

FOREIGN PATENT DOCUMENTS

| | | | |
|---|---|---|---|
| DE | 102006032781 A1 | 1/2008 | |
| DE | 202007003703 U1 | 8/2008 | |
| EP | 1306278 A2 * | 5/2003 | B60T 7/16 |
| ES | 2147117 A1 | 8/2000 | |

\* cited by examiner

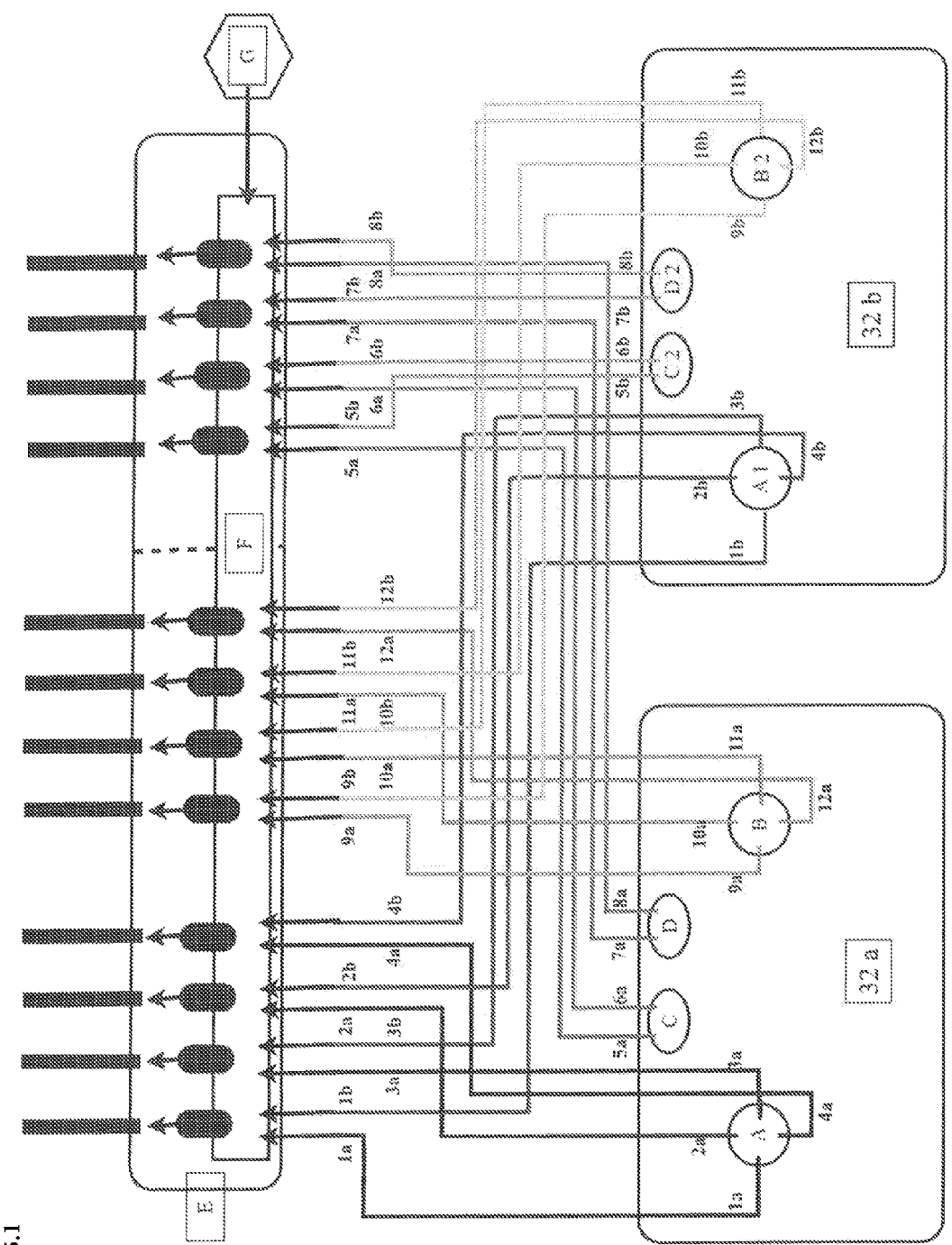
Figure 5.1

CONSTRUCTION MACHINERY

CROSS REFERENCE TO RELATED APPLICATIONS

This application claims the benefit of German Application No. 102012103070.7 filed on Apr. 10, 2012; the application is incorporated by reference herein in its entirety.

BACKGROUND

This invention relates to construction machinery or a utility vehicle with at least one vehicle cabin or at least one driver's cab with a first seat with first control devices for a first operator, from which all of the essential driving and/or work functions of the construction machinery or of the utility vehicle can be controlled. At least one second seat with second control devices for a second operator is provided in the vehicle cabin/the driver's cab, from which all of the essential driving and/or operating functions of the construction machinery or of the utility vehicle can likewise be controlled, including a steering function for the vehicle. Control elements are provided by means of which a higher standing is assigned to the second control devices when the first and second control devices are simultaneously actuated, so that the second control devices override the first control devices.

So-called driving school vehicles in which control devices are provided for a second person, especially a driving instructor who sits on a seat next to the driver to be trained as a rule and who can intervene in events via his control devices when necessary, are known from the prior art; the second control devices have a higher standing vis-a-vis the first control devices of the driver, so the function carried out by the driver is overridden when the driving instructor intervenes. Only limited functions are usually provided for the second person in training vehicles of that type, though; they are the gas pedal, brake or clutch as a rule. The driving instructor cannot carry out a steering function, however. In the case of construction machinery, however, training according to the prior art up to now has either taken place via a second person in the driver's cab, who cannot directly intervene in events but only gives instructions, or the second person is even outside of the driver's cab, because there is not enough space in it for the second person.

DE 20 2007 003 703 U1 describes a military driving school vehicle in the form of a driving school tank with a driver's area and a driving instructor's area; a second steering mechanism that is coupled to a first steering mechanism via a cable and a magnetic return spring and that can override it in this way is assigned to the latter. Furthermore, the driving instructor's area has a second brake pedal that acts upon a hydraulic circuit via an application valve and that can act upon the first brake pedal of the driver's area via mechanical connection elements and override it from the driving instructor's area. This known vehicle does not involve a work vehicle, however, in which a dipper arm or extension arm has to be operated, for example. The above-mentioned document therefore does not offer a solution for overriding control elements for actuating a dipper arm or extension arm, for which so-called joysticks are used as a rule.

DE 10 2006 032 781 A1 relates to an arrangement for operating an actuator unit provided to guide a vehicle by means of an operating unit on the driver's side and an operating unit on the passenger's side in which control signals are generated that are transmitted to a control unit. The operating unit on the driver's side and on the passenger's side can be a steering wheel module, a brake pedal unit, a gas pedal unit or a clutch pedal unit here. This known arrangement is consequently only intended to be used for the above-mentioned control elements of motor vehicles and is used in driving school vehicles in the form of passenger cars. There are also no suggestions in this document for solutions as to how construction machinery can be equipped with two driver's areas from which all of the control functions of the construction machinery can be carried out in each case.

The Spanish patent specification ES 2 147 117 A1 describes trucks with two driver's areas next to one another that both have their own steering wheel and their own gas, brake and clutch pedals. Steering, acceleration and braking devices of the vehicle can be operated from both driver's areas via mechanical coupling elements. Only the gear shift and display instruments are arranged in the area of a central console between the two driver's areas. This vehicle also involves a customary driving school vehicle in the area of trucks. There are no provisions for the operation of work functions of the vehicle via joysticks.

DE 201 17 325 U1 describes a control device for use in a driving school vehicle that is driven by a learner driver; the control device controls functions or devices of the driving school vehicle. A driving instructor's stand that can be located in a second vehicle has a wireless module so that the driving school vehicle can be remotely controlled via a transmitter and receiver. Functions of the driving school vehicle such as the brake pedal, the gas pedal, the clutch pedal and the blinkers can be remotely controlled in a wireless fashion. The driving school vehicle also involves a motor vehicle for road traffic here, especially a bus.

In the case of earthwork machinery, multi-function operating controls that can be moved by hand are generally used as control elements (so-called joysticks); there are usually two joysticks of this type that are operated with the right hand or the left hand, and all of the basic functions of the vehicle are controlled by means of them, especially the advance, the back drive, the rotation of the vehicle around a standing chain, the rotation of the uppercarriage, the extension and retraction of the arm cylinder, the lowering and lifting of the extension arm, the tipping and dumping of the dipper etc. In the process, there can be functions that are only operated with one joystick and those that are controlled via the simultaneous operation of both of the joysticks. Multi-function operating controls (joysticks) of this type can both be tilted forwards or backwards and to either side starting from an upright position, so at least four different functions can be controlled by the operation of a joystick alone.

SUMMARY

This invention relates to construction machinery (30) or a utility vehicle with at least one vehicle cabin (32) or at least one driver's cab with a first seat (33) with first control devices (10) for a first operator, from which all of the essential driving and/or work functions of the utility vehicle/construction machinery can be controlled. At least one second seat (34) with second control devices (11) for a second operator is provided in the vehicle cabin/the driver's cab in accordance with the invention, from which all of the essential driving and/or work functions of the utility vehicle/construction machinery can likewise be controlled, including a steering function for the vehicle. Control elements are provided by means of which a higher priority is assigned to the second control devices (11) when the first and second control devices are simultaneously actuated, so that the second control devices override the first control devices (10).

DETAILED DESCRIPTION

This invention is based on the realization that persons who have not been training on construction machinery or a utility vehicle, for instance children or handicapped persons or also interested adults, would gladly like to operate machinery of that type. That is not possible on the know machinery. In so far as the invention relates to utility vehicles, vehicles with work functions are meant by that, i.e. vehicles that unlike passenger cars or trucks are not primarily intended to be used for road traffic. That does not rule out a situation in which a utility vehicle of that type will also be allowed on roads to drive from one work site to another, however.

The problem involved with the invention is to therefore create construction machinery that enables operation of all of the functions by a first person to the extent possible, but a second trained person can intervene in the events at any time when necessary for safety reasons.

The solution of this problem results in construction machinery in accordance with the invention with the features of Claim 1.

There are provisions in accordance with the invention for the first control devices and the second control devices to each comprise at least one multi-function operating control that can be operated by hand. A multi-function operating control in this sense is understood to mean a joystick that can be tilted forwards or backwards as a rule, as well as to either side, and that activates various work or even driving functions of the machinery in the process.

The first control devices and the second control devices preferably each comprise at least two multi-function operating controls of the above-mentioned type that can be operated manually, which can be operated with the right hand and with the left hand, for instance, and which are arranged appropriately on the right and left-hand side of the driver, so that up to eight different operating functions of the machine can be carried out by tilting these control devices in four different directions in each case.

There can, as a preference, be further provisions for at least one other operating function of the construction machinery or of the utility vehicle to be carried out via a simultaneous actuation of two multi-function operating controls of the first control devices or of the second control devices, for instance a simultaneous pressing and tilting of both multi-function operating controls forwards or backwards. Assignments in accordance with so-called European control, as it is frequently used in earthwork machinery, can be provided for the multi-function operating controls as an example.

All of the important driving and work functions of the construction machinery can be operated from the first seat and from the second seat, so the first person can work normally from the first seat, but as soon as the first person makes an operating mistake, the second person can intervene and correct it from the second seat.

The first and second seats can be located in the same drive driver's cabs or vehicle cabins or, if applicable, also in separate driver's cabs or vehicle cabins if the machinery has two of them. The communication between the first person and the second person can take place via microphones and loudspeakers in the case of separate vehicle cabins.

The second seat can be arranged behind the first seat and then somewhat higher if applicable. But the second seat can also be located next to or in front of the first seat. Alternatively two seats and/or two cabins can also be arranged on top of one another, which is useful in the case of fairly large construction machines such as wheel loaders, for instance.

The vehicle cabin can be designed to be longer, wider or higher vis-a-vis standard machinery, in order to hold two seats with the control devices assigned to them.

There can also be provisions for the second person to intervene in events via remote control from outside of the vehicle cabin.

An emergency switch can be provided in the area of the second seat for additional safety, as an example, so that the second person can also completely shut the machine if necessary when there is a danger. Alternatively or in addition to that, a switch can also be provided that can be used to disable the functions of the control devices of the first seat, so that only the second person can carry out operations.

A third seat can exist to include a further person who observes events, for instance; that could be a support person or an accompanying person providing assistance for a handicapped person or a parent in the case of children as examples.

Further safety can be brought about by provided a safety belt for at least the first seat, in particular a three-point belt.

The optimization of the view of the second person into the work area of the construction machinery can be further improved if necessary with the aid of mirrors or cameras on the vehicle and/or monitors in the vehicle cabin.

The most diverse work and driving functions of the construction machinery can be operated through the first and second control devices, for instance driving wheels or chains, rotation of the driver's cab, actuation of work arms or extension arms or lifting devices, actuation of hydraulic cylinders for arms, joints, dippers, front plates etc.

There can be provisions, as an example, for the control devices to work in a slower fashion at the first seat and/or respond with a delay to simplify the work from the first seat for an untrained person.

A preferred further design form of the invention provides for a switching device by means of which one can switch over from a higher priority of the second control devices to a higher priority of the first control devices. This makes it possible for the control signals that are being transmitted from the control devices of the first seat to now be controlling. Furthermore, this also creates a possibility for the trained person to work from the first seat and to specify the manner in which the machinery will operate and for the person in the second seat to only watch and monitor the work procedure. It is then also possible for only one person to work on the machine from the first seat in the normal mode.

As examples, the utility vehicle/the construction machinery in accordance with the invention could be a crawler, an excavator, a crane, a cement mixer, a wheel loader, a loading ramp, a bulldozer, a low-bed trailer, a road roller, a mobile crane or a tower crane.

The features specified in the sub-claims relate to preferred further design forms of the problem solution in accordance with the invention. Further advantages of the invention ensue from the following detailed description.

BRIEF DESCRIPTION OF THE DRAWINGS

This invention will be described in more detail below with the aid of examples making reference to the enclosed drawings.

The following are shown here:

FIG. 5.1 shows a diagram that aids in an explanation of the control functions for an alternative variant of the excavator in accordance with the invention;

DETAILED DESCRIPTION OF THE PREFERRED EMBODIMENT

Figure 1:
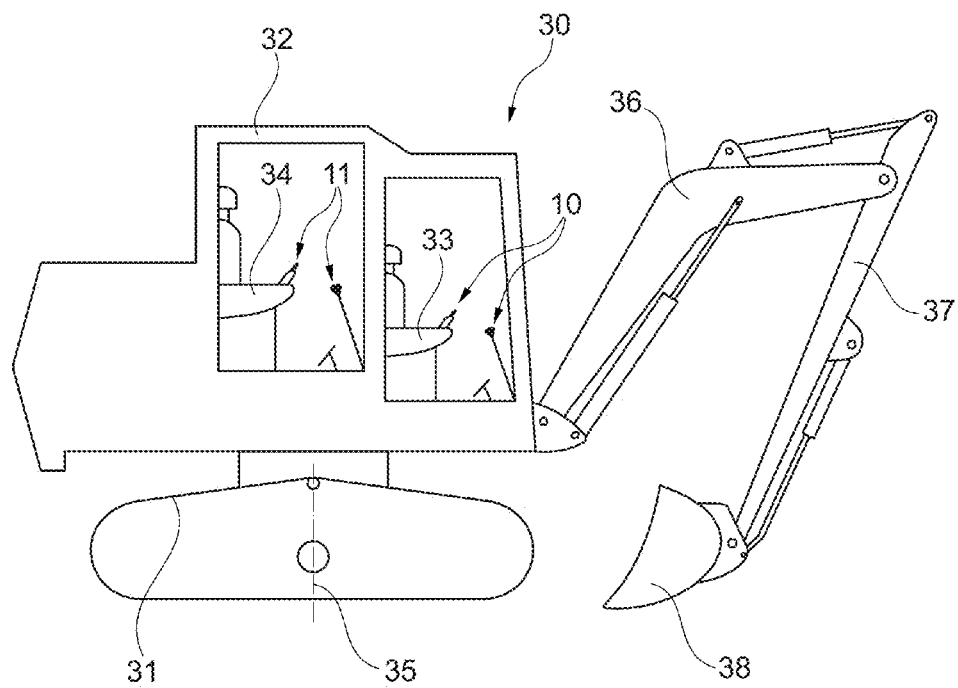
FIG. 1 shows a side view of an excavator in accordance with an exemplified variant of the invention in a simplified form.

An initial, exemplified design variant of construction machinery equipped with two seats in accordance with the invention will be explained in more detail below with reference to FIGS. 1 and 2. An excavator 30 with a chain drive 31 is involved here. Unlike a customary excavator, the excavator 30 in accordance with the invention has a vehicle cabin 32 with two seats arranged one in back of the other, namely a first front seat 33 and a second rear seat 34. To make this arrangement of two seats 33, 34 possible, the vehicle cabin 32 has been lengthened vis-a-vis a customary excavator and the center of gravity of the vehicle cabin has been changed, for instance via weights, in such a way that it is located to a great extent at the height of the vertical axis 35 around which the vehicle cabin 32 swivels.

The rear seat 34 is arranged to be somewhat higher than the front seat 33, so the rear driver will have an adequate view of the working field of the excavator 30. Both of the seats 33, 34 are equipped with all of the control devices 10, 11, so all of the driving functions and work functions of the machine can be operated from each of the two seats 33, 34. The second control devices 11 assigned to the second seat 34 override the first control devices 10 of the first seat 33 here, so the driver in the second seat can correct faulty operations of the driver in the first seat.

Figure 2:
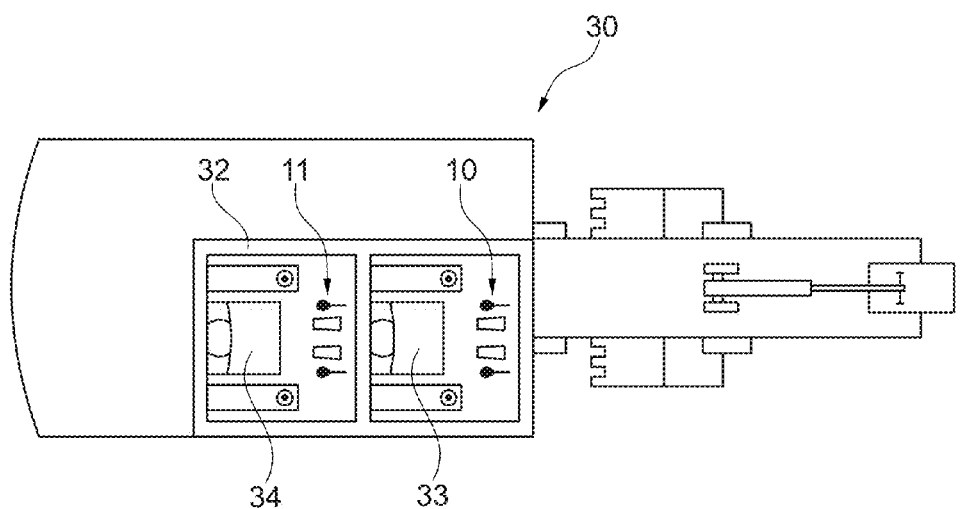
FIG. 2 shows a top view of the excavator of FIG. 1 in a simplified form.

The excavator 30 shown in FIGS. 1 and 2 has a main arm 36 that can be swiveled via a hydraulic piston-cylinder unit, a front arm 37 connected with this so as to be able to swivel, and a dipper 38 at the front end of the front arm 37, which can likewise be swiveled to carry out the excavation function. All of these functions, as well as the rotation of the vehicle cabin 32 around its vertical axis 35 and the drive of the chain 31 are operated via joysticks, levers and pedals as a rule in an excavator. These control devices 10, 11 are provided twice, as FIG. 2 also shows, and are assigned to the two seats 33, 34.

Figure 3:
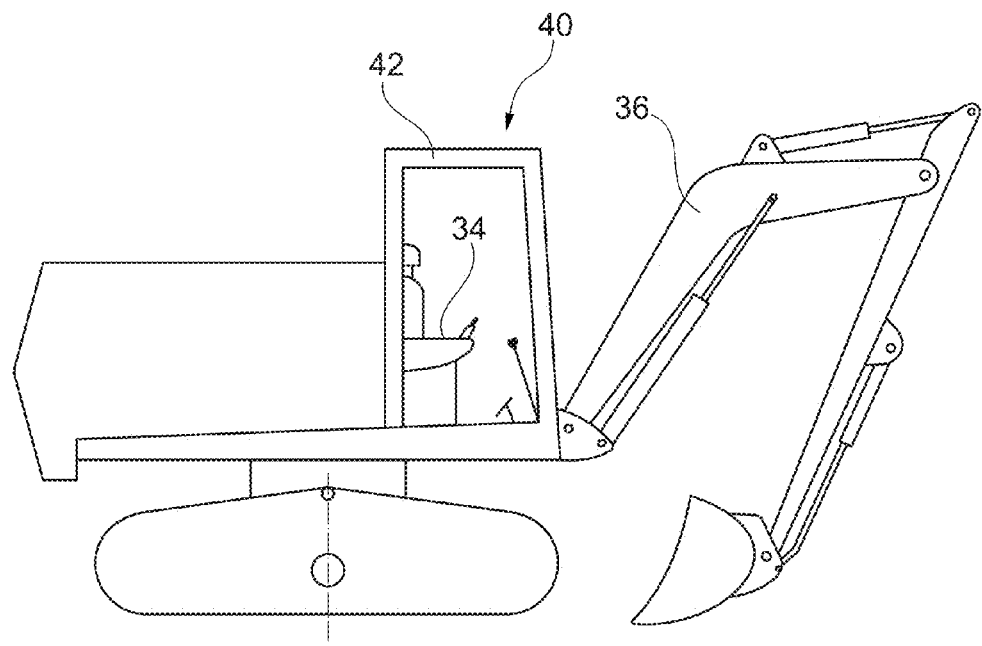
FIG. 3 shows a side view of an excavator in accordance with an alternative variant of the invention in a simplified form.
Figure 4:
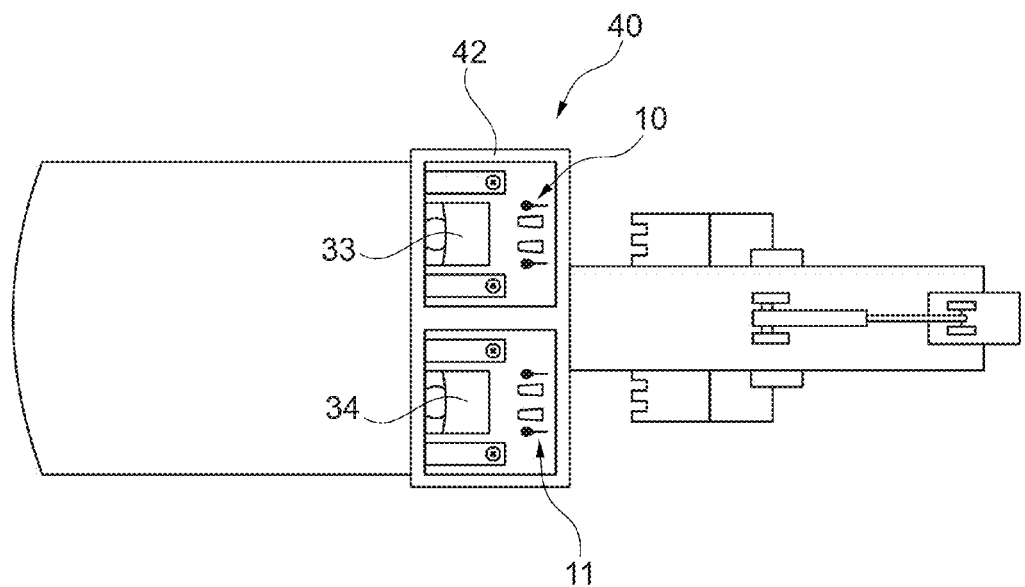
FIG. 4 shows a corresponding top view of the excavator of FIG. 3.

An alternative variant in which the excavator 40 has a double cabin 42 with two seats 33, 34 arranged next to one another is shown in the example in accordance with FIGS. 3 and 4. The vehicle cabin 42 can therefore be designed to be somewhat more broad here than is the case with a customary excavator. Moreover, the excavator 40 can likewise be designed like the excavator in accordance with FIG. 2 with regard to its arm 36 and the various work functions. The complete control devices 10, 11 also exist at both seats 33, 34 here, so each of the drivers can operate all of the driving and work functions of the machine. The control devices 11 at the second seat 34 override the corresponding control devices 10 at the first seat 33 once again.

Exemplified first control elements 10 for actuating the various driving and work functions in construction machinery in accordance with the invention are explained below with reference to FIG. 6. The second control elements 11 that are assigned to the second seat for the second person can have a design that is analogous in principle to the first control elements 10, and they will therefore not be explained in more detail below.

The first control elements 10 are comprised of two multi-function operating controls 43, 44, which will be designated in a simplified fashion as "joysticks" below. The first joystick 43 is located on the left-hand side of the driver's seat (not included in the drawing here), and the second joystick 44 is located on the right-hand side of the driver's seat, so the first joystick 43 can be operated with the left hand and the second joystick 44 can be operated with the right hand. The first joystick 43 can be moved to the left in a tilting movement in accordance with the arrow 45, in order to thereby bring about a rotation of the uppercarriage of the construction machinery to the left-hand side around its axis. Accordingly, a tilting of the first joystick 43 to the right-hand side in the direction of the arrow 46 brings about a rotation of the uppercarriage to the right-hand side. The operator can move the first joystick 43 forwards with the arrow 47 and thereby extend an arm cylinder of the construction machinery, for instance. The first joystick 43 can be tilted backwards with the arrow 48; the arm cylinder of the construction machinery is retracted because of that. At least four different operating functions are consequently possible when the first joystick 43 is actuated; the joystick is correspondingly swivel-mounted and tiltable or movable for this. This type of control is quite common in construction machinery, especially earthwork machinery such as excavators, crawlers or the like.

Figure 6:
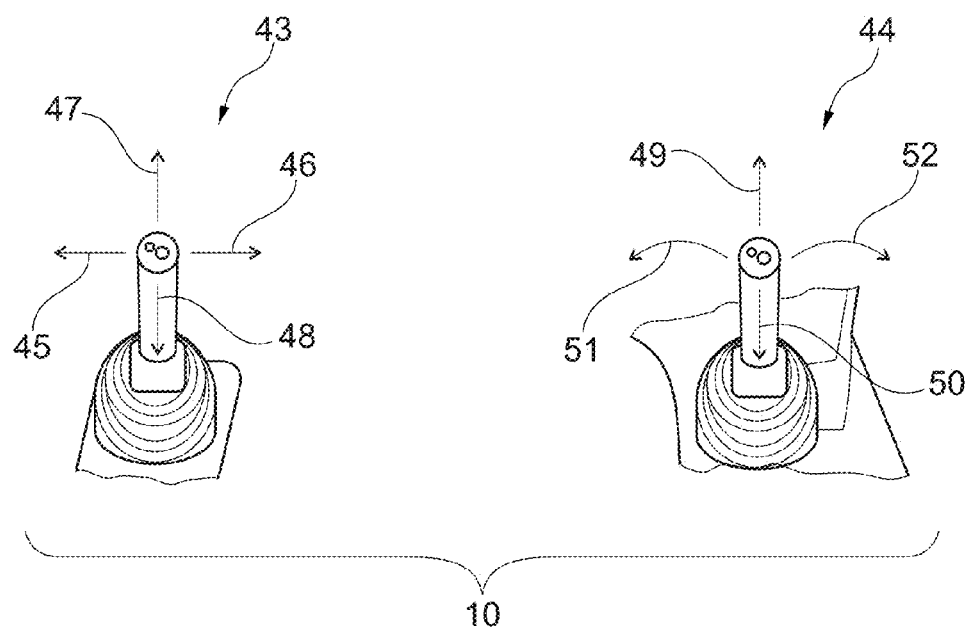
FIG. 6 shows a schematic view of exemplified first or second control devices with two multi-function operating controls in the seating area of construction machinery in accordance with the invention.

Since corresponding joysticks are also assigned in accordance with the invention to the second seat with the second control elements that are shown in FIG. 6, the control unit of the machine is designed in such a way that all of these operating functions of the first control elements 10 can be overridden by the second control elements 11 in each case. The work and driving functions are actuated hydraulically as a rule in construction machinery of that type, so a corresponding valve in a system of hydraulic lines is closed or opened, as an example, when the joystick 43 is moved in the direction of one of the arrows 45-48 in FIG. 6. In the case that the respective functions are overridden by the second control elements, their control command is given priority and the valve is controlled in accordance with the control command of the second control elements, so the control command of the first control elements is inoperative in the moment that the overriding takes place.

The second joystick 44 that is to be operated with the right hand likewise actuates at least four functions of the construction machinery; as an example, the tilting movement of the joystick 44 forwards in accordance with the arrow 49 lowers an extension arm of the construction machinery and the same extension arm is lifted with the tilting movement of the joystick 44 backwards in the direction of the arrow 50. If the joystick 44 is moved to the left in the direction of the arrow 51, the dipper of an excavator is tipped, for example, and the same dipper of the excavator is dumped out when there is a movement of the joystick 44 to the right in the direction of the arrow 52. Those kinds of swiveling movements of arms, extension arms and dippers of construction machinery are also brought about in a hydraulic fashion as a rule, so the corresponding hydraulic valves are opened or closed through the control unit of the machine when the joystick 44 is actuated.

Since the first control elements 10 are comprised of two joysticks 43, 44, the individual functions of which have been explained above, it is possible to assign even further operating functions to these joysticks when both of the joysticks are jointly moved. As an example, functions for steering or driving movement can be assigned to a simultaneous actuation of both of the joysticks. The construction machinery could move forwards, for instance, when both of the joysticks 43, 44 are pressed forwards in the direction of the arrows 47, 49 or the construction machinery, which has a chain drive, could rotate on the spot when the one joystick 43 is pressed forward and the other joystick 44 is simultaneously pulled back. These functions of the construction machinery can also be overridden by the second control elements with the design of the control elements in accordance with the invention.

The various control functions of an exemplified excavator control unit in accordance with the invention will be explained in more detail below with reference to the diagram of FIG. 5. The two lower, more or less rectangular blocks symbolize the two cabins 32 a and 32 b that the excavator in accordance with the invention has; in this case, the cabin 32 a on the left-hand side in the illustration is the dominant cabin and it consequently corresponds to the second control devices in accordance with the terminology of this application, and the cabin 32 b on the right hand side is the subordinate cabin and it consequently corresponds to the first control devices. Two joysticks are located in each of the two cabins 32 a, 32 b, namely the joysticks A and B in the cabin 32 a on the left-hand side and the joysticks A1 and B2 in the cabin 32 b on the right-hand side.

Four hydraulic lines 1a, 2a, 3a, 4a go to these assigned hydraulic valves in the control block E in each case from the left-hand joystick A in the left-hand cabin 32 a; these valves are used, for instance, for the control of the main excavator arm and for the rotation of the top part (uppercarriage) around its axis. As can be further seen in FIG. 5, four hydraulic lines 1b, 2b, 3b, 4b, which are responsible for the control of the same functions and which are consequently routed to the same hydraulic valves of the control block, likewise come out of the right-hand cabin 32 b, in which the joystick A1 is located on the left-hand side. These hydraulic valves could involve valves that have two inputs and only one output, for example, that are routed via lines to the corresponding components of the machine in order to bring about the desired work functions. The problem of overriding the commands from the lines 1a, 2a, 3a, 4a vis-a-vis those from the lines 1b, 2b, 3b, 4b can be solved with regard to the control technology, as an example, by allocating less pressure to the hydraulic lines coming from the second cabin 32 b in each case and allocating more pressure to those coming from the first cabin 32 a. If a control command with a pressure of 50 bar, for instance, then goes out from the subordinate cabin 32 b, and this command is to be overridden by the person in the dominant cabin 32 a, a control command with 70 bar, for instance, will then be generated there when the corresponding control element is actuated, for instance at the corresponding hydraulic valve in the control block E; the first command will be overridden because of that.

A second joystick B or B2, respectively, via which each of four operating functions of the machine is controlled once again, is located in the cabin 32 a just as it is in the cabin 32 b. The joystick B is connected via the hydraulic lines 9a, 10a, 11a, 12a to the corresponding hydraulic valves of the control block E, which also once again have two inputs in each case here, so the four hydraulic lines 9b, 10b, 11b, 12b also go in there from the second joystick B2 of the second cabin 32 b and the commands from the second cabin 32 b can be overridden by those of the first cabin 32 a in the manner described above. Work functions of an excavator, such as the lifting or lowering of an extension arm and the opening or closing of an excavator dipper, can be controlled, as an example, via the hydraulic lines 9b, 10b, 11b, 12b.

Furthermore, two levers C, D or C2, D2 for the chain control of the excavator are located in each case in the two cabins 32 a and 32 b, respectively. Each of the two chains can be separately controlled via one of these levers in each case; if both of the levers are simultaneously moved, that leads to a forwards or backwards driving motion. The two hydraulic lines 5a and 6a go from the left-hand chain control C to the control block E, and the two hydraulic lines 7a and 8a go from the right-hand chain control D to the control block E; the area in the drawing pertaining to the chain control is separately shown in the right-hand section of the control block E for the sake of greater clarity. Likewise, the corresponding hydraulic lines 5b, 6b, 7b, 8b are routed from the chain controls C2 and D2 of the right-hand cabin 32 b to this area of the control block E; the corresponding hydraulic valves also have two inputs in each case, but only one output that is routed to the respective machine parts of the excavator that are to be actuated. It is also possible in the case of the chain controls to override the operating functions C2 and D2 in the right-hand cabin 32 b via the actuation of the corresponding operating lever C and D of the chain control in the left-hand cabin 32 a.

Figure 5:
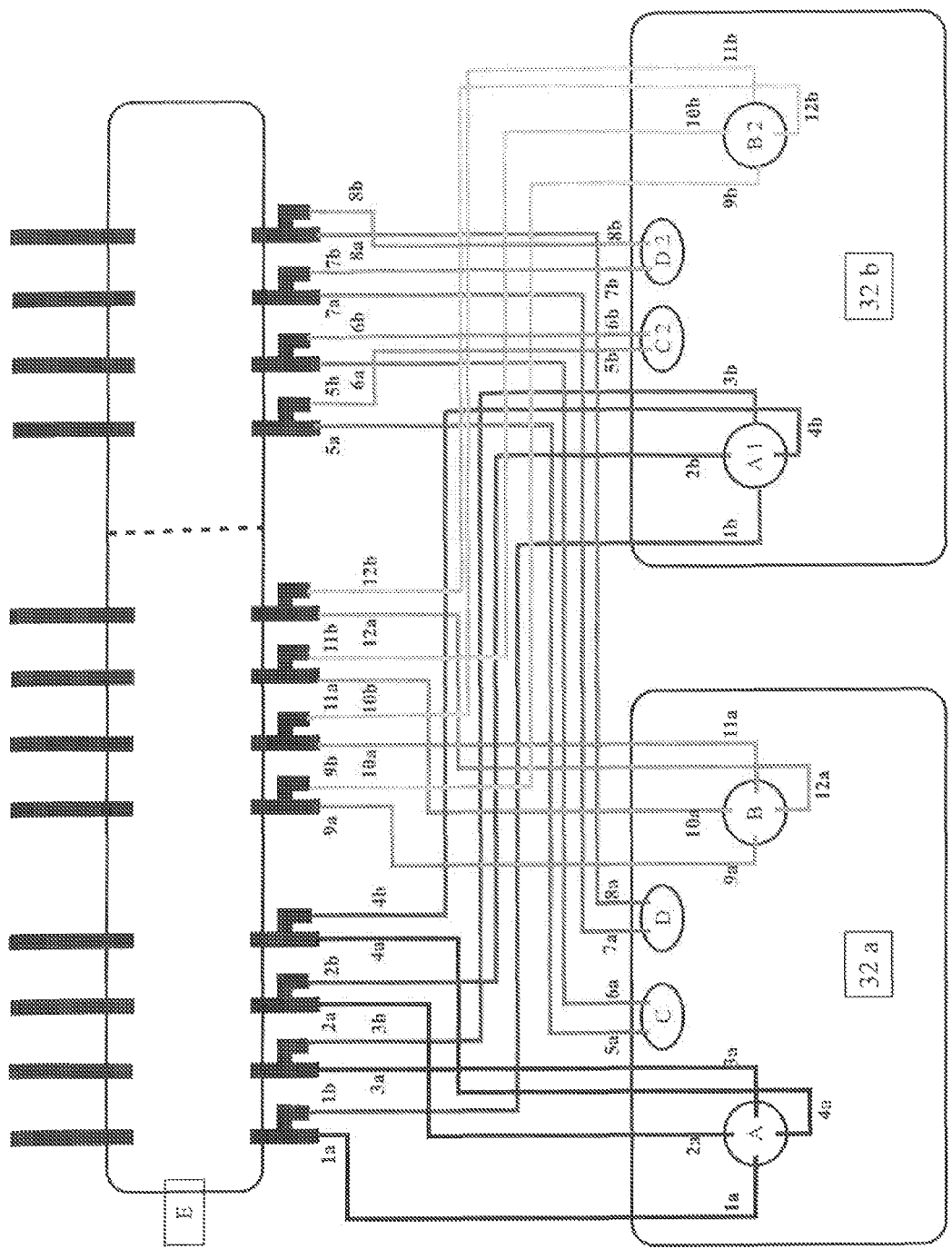
FIG. 5 shows a diagram that aids in an explanation of the control functions of the excavator in accordance with the invention.

FIG. 5.1 shows an alternative variant of the control unit of the machine described above, which has a very similar structure in principle to the variant previously described with reference to FIG. 5. No hydraulic valves are used here in the input area of the control unit, though, and the lines from the control elements in the two cabins 32 a and 32 b to the control block E are not hydraulic lines here, but instead electrical lines, that merely convey control commands, because the control block E is comprised of an electronic pilot control unit here. A bus system can be used for the control block E, for instance, and a microprocessor can be programmed in a suitable way so that the commands going into the control block from the first cabin 32 a via the various lines 1a-12a or from the second cabin 32 b via the lines 1b-12b will be electronically processed and the hydraulic lines to the respective machine parts to be addressed will then be correspondingly controlled on the output side by the control block in each case.

In the variant of FIG. 5.1, the control block is comprised of a programmable control unit F for the valve control, so that the priority of the control elements of one cabin or the other can now be switched over if necessary in a simple way. Now there can consequently also be provisions for the second cabin 32 b on the right-hand side in the drawing to be the dominant cabin and for the left-hand cabin 32 a to be the subordinate cabin by appropriately changing this over via a switch in one of the cabins, for instance, which will then change the priority in the control block.

Furthermore, an optional wireless receiver G for signals of a wireless remote control is provided in the variant in accordance with FIG. 5.1, so that one can act on the control block via the remote control and generate commands from outside of the machine that will carry out the desired operating functions of the machine.

Figure 7:
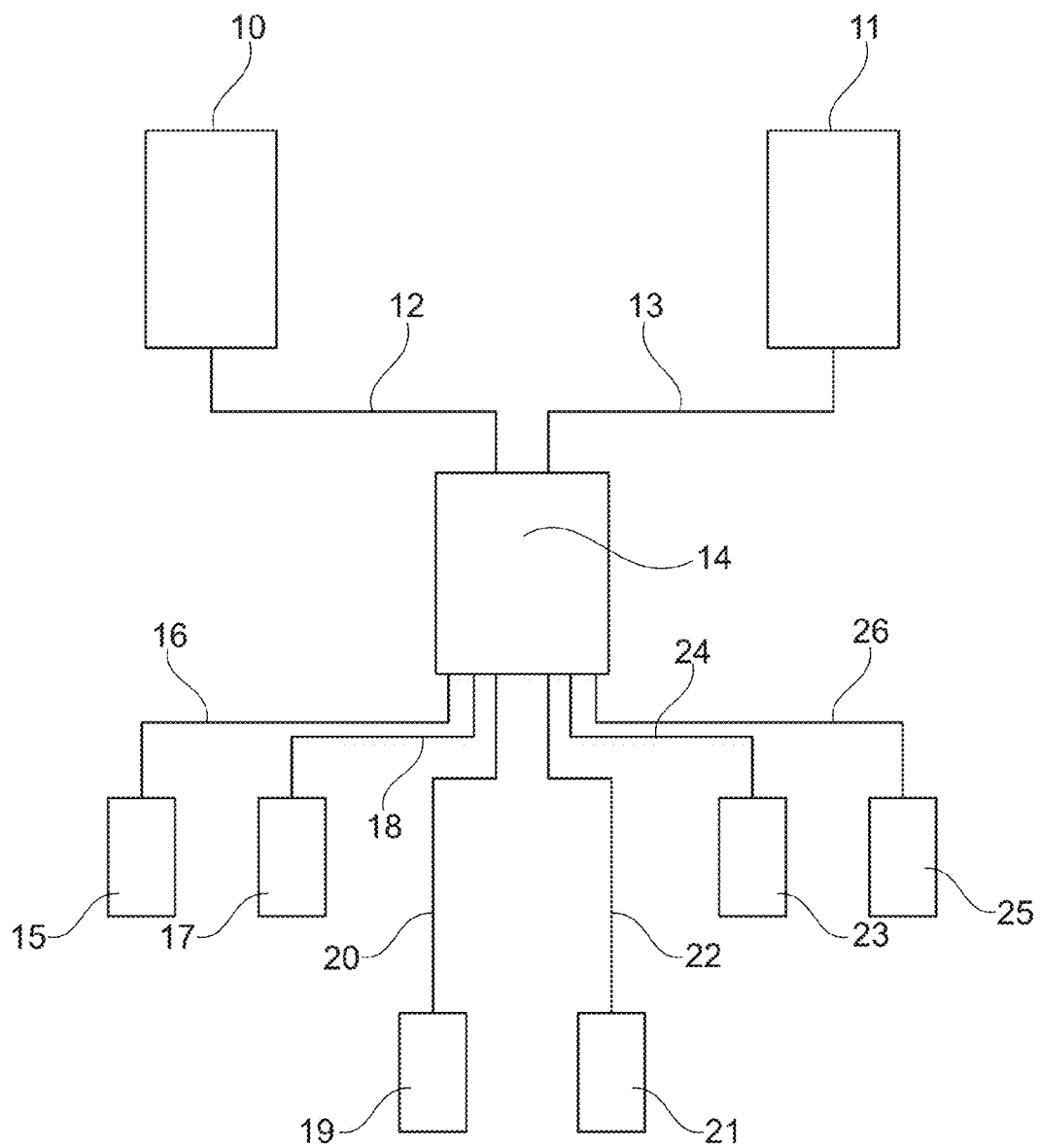
FIG. 7 shows a schematic drawing relating to an exemplified explanation of the way in which construction machinery in accordance with the invention works.

The operating principle of construction machinery in accordance with the invention will be explained once again below with reference to the diagram of FIG. 7. The first control devices 10 are assigned to a first seat for a first person who controls various functions of construction machinery or of a utility vehicle. The example involves an excavator with a chain drive. Moreover, second control devices 11 are assigned to a second seat for a second person in a driver's cab; the second person can carry out all of the functions that the first person also carries out via the control devices 10. The control signals for the various functions go from the first control devices 10 through the control line 12 to the control unit 14, whereas the functions carried out in the second control devices 11 send control signals through the control line 13 to the control unit 14. The control lines then go from the control unit 14 to the various functional modules of the machine. In the example, the control line 16 is routed to the functional module 15, which brings about a rotation of the driver's cab around its vertical axis. The control line 18 is routed to the functional module 17, which brings about a hydraulically induced swiveling movement of an excavator arm.

The control line 20 is routed to the functional module 19, which brings about a swiveling movement of a second excavator arm. The control line 22 is routed to the functional module 21, which brings about a swiveling movement of an excavator dipper vis-a-vis the arm to which it is attached.

The control line 24 is routed, as an example, to a functional module 23, which controls the speed of an advancing movement of the vehicle.

The control line 26 is routed to the functional module 25, which acts on a chain drive of the vehicle so that the vehicle drives forwards or backwards as the case may be.

All of the functional modules 15, 17, 19, 21, 23, 25 of the machine can consequently be reached by the first control devices 10 through the central control unit 14. There is a hierarchical order of precedence in the control unit that leads, when one of the above-mentioned functional modules is simultaneously addressed via the second control devices 11 and the control line 13, to this signal overriding a different signal for the respective functional module coming from the first control devices, so the command coming from the first control devices 10 is no longer carried out; instead, the command from the second control devices 11 is carried out.

LIST OF REFERENCE NUMERALS

1 *a* to 12 *a* Hydraulic lines/electrical lines
1 *b* to 12 *b* Hydraulic lines/electrical lines
A First joystick
A1 First joystick (right-hand side)
B Second joystick
B2 Second joystick (right-hand side)
C Chain control
C2 Chain control (right-hand side)
D Chain control
D2 Chain control (right-hand side)
E Control block
F Programmable control unit
G Wireless receiver for remote control
10 First control devices
11 Second control devices
12 Control line
13 Control line
14 Control unit
15 Functional module
16 Control line
17 Functional module
18 Control line
19 Functional module
20 Control line
21 Functional module
22 Control line
23 Functional module
24 Control line
25 Functional module
26 Control line
30 Excavator
31 Chain drive
32 Vehicle cabin
32 *a* Left cabin
32 *b* Right cabin
33 Front seat
34 Back seat
35 Axis
36 Main arm
37 Front arm
38 Dipper
40 Excavator
42 Double cabin
43 First multi-function operating control (joystick)
44 Second multi-function operating control (joystick)
45 Arrow
46 Arrow
47 Arrow
48 Arrow
49 Arrow
50 Arrow
51 Arrow
52 Arrow

The invention claimed is:

1. Construction machinery or a utility vehicle with at least one vehicle cabin (32) or at least one driver's cab with a first seat (33) with first control devices (10) for a first operator, from which all of the essential driving and/or work functions of the utility vehicle/construction machinery can be controlled, wherein at least one second seat (34) with second control devices (11) for a second operator is provided in the vehicle cabin/the driver's cab, from which all of the essential driving and/or work functions of the utility vehicle/construction machinery can likewise be controlled, including a steering function for the vehicle, wherein control elements are provided by means of which a higher priority is assigned to the second control devices (11) when the first and second control devices are simultaneously actuated, so that the second control devices override the first control devices (10), characterized in that the first control devices (10) and the second control devices (11) each comprise at least two multi-function operating controls (43, 44) that can be operated by hand.

2. Construction machinery or utility vehicle according to claim 1, characterized in that a multi-function operating control (43, 44) carries out at least four different operating functions in each case via a tilting movement or shifting movement forwards, a tilting movement or shifting movement backwards, a tilting movement or shifting movement to the right-hand side and a tilting movement or shifting movement to the left-hand side.

3. Construction machinery or utility vehicle according to claim 1, characterized in that at least one further operating function of the construction machinery or of the utility vehicle is carried out via a simultaneous actuation of two multi-function operating controls (43, 44) of the first control devices (10) or of the second control devices (11).

4. Construction machinery or utility vehicle according to claim 1, characterized in that the second seat (34) is located behind or in front of the first seat (33) or next to the first seat (33), or above or below the first seat.

5. Construction machinery or utility vehicle according to claim 1, characterized in that the center of gravity of the vehicle/of the construction machinery is balanced out in such a way that is roughly in the center in the area of a central axis of rotation of the vehicle cabin/of the driver's cab when there is a longer or wider vehicle cabin (32)/longer or wider driver's cab or the center of gravity is otherwise optimized in accordance with the way in which the construction machinery/the utility vehicle operates.

6. Construction machinery or utility vehicle according to claim 1, characterized in that a switching device is provided by means of which switching can be done from a higher priority of the second control devices (11) to a higher priority of the first control devices (11).

7. Construction machinery or utility vehicle according to claim 1, characterized in that devices (G) are provided by means of which individual or several of the second control devices (11) can be remotely controlled from outside of the vehicle cabin (32)/of the driver's cab.

8. Construction machinery or utility vehicle according to claim 1, characterized in that at least one emergency switch is provided in the area of the second control devices, by means of which the motor of the construction machinery/of the utility vehicle can be shut off, or at least the control devices of the first seat can be disabled.

9. Construction machinery or utility vehicle according to claim 1, characterized in that the utility vehicle/the construction machinery is a crawler, an excavator (30), a crane, a cement mixer, a wheel loader, a loading ramp, a bulldozer, a low-bed trailer, a dump truck, a road roller, a mobile crane or a tower crane.

10. Construction machinery or utility vehicle according to claim 1, characterized in that at least one of the control devices (10, 11) is intended to be used for the actuation of backwards travel, forwards travel, a steering function, a chain advance, a rotation of the vehicle cabin/of the driver's cab around a vertical axis, an actuation of a work arm, of an extension arm, a lifting function, a swiveling movement of a work arm or of a joint of a dipper or of a front plate.

11. Construction machinery or utility vehicle according to claim 1, characterized in that a device is provided that brings about a delayed response and/or a slowed-down movement of the respective driving or work function when it is initiated via actuation of one of the first control devices (10).

12. Construction machinery or utility vehicle according to claim 1, characterized in that hydraulic lines go from the second control devices (A, B, C, D) and from the first control devices (A1, B2, C2, D2) in each case to hydraulic valves in each case that are assigned to the respective operating functions, wherein the hydraulic valves each have two inputs and one output to a control block (E) from which the individual hydraulic lines go to the machine parts of the construction machinery that are to be controlled in each case.

13. Construction machinery or utility vehicle according to claim 1, characterized in that electrical lines go from the second control devices (A, B, C, D) and from the first control devices (A1, B2, C2, D2) in each case to a control block (E) with an electronic pilot control assigned to the respective operating functions, wherein the control unit for each operating function has two inputs in each case and one output in each case in the area of the control block (E) from which the individual hydraulic lines go to the machine parts of the construction machinery that are to be controlled in each case.

14. Construction machinery or utility vehicle according to claim 12, characterized in that a control unit (F) for the valve control in the area of the control block (E) is programmable and a changeover can be done via a switch of the construction machinery/of the utility vehicle that changes the respective priority of the second control devices (A, B, C, D) into a priority of the first control devices (A1, B2, C2, D2) or the other way around.

* * * * *